US010388463B2

United States Patent
Uka et al.

(10) Patent No.: US 10,388,463 B2
(45) Date of Patent: Aug. 20, 2019

(54) ELECTROLYTIC CAPACITOR AND CONDUCTIVE POLYMER DISPERSION

(71) Applicant: Panasonic Intellectual Property Management Co., Ltd., Osaka (JP)

(72) Inventors: Youichirou Uka, Hyogo (JP); Katsuya Miyahara, Osaka (JP); Hiroshi Kojima, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/812,348

(22) Filed: Nov. 14, 2017

(65) Prior Publication Data

US 2018/0068801 A1    Mar. 8, 2018

Related U.S. Application Data

(63) Continuation of application No. PCT/JP2016/001809, filed on Mar. 29, 2016.

(30) Foreign Application Priority Data

May 29, 2015  (JP) .................................. 2015-109751

(51) Int. Cl.
*H01G 9/028*     (2006.01)
*H01G 9/15*      (2006.01)
(Continued)

(52) U.S. Cl.
CPC ......... *H01G 9/028* (2013.01); *C08G 73/0266* (2013.01); *C08K 3/04* (2013.01);
(Continued)

(58) Field of Classification Search
CPC .... H01G 9/028; H01G 9/0032; H01G 9/0036; H01G 9/042; H01G 9/15; H01G 9/048;
(Continued)

(56) References Cited

U.S. PATENT DOCUMENTS

| 5,422,423 A * | 6/1995 | Shacklette | ......... C08G 73/0266 |
| | | | 252/500 |
| 2008/0232035 A1* | 9/2008 | Biler | .................... H01G 9/0036 |
| | | | 361/525 |

(Continued)

FOREIGN PATENT DOCUMENTS

| CN | 101486839 A | 7/2009 | |
| JP | 2014086473 | * 5/2014 | ............... H01G 9/15 |
| WO | 2011/004833 | 1/2011 | |

OTHER PUBLICATIONS

Machine translation of JP 2014086473 (Year: 2014).*

(Continued)

*Primary Examiner* — Dion Ferguson

(74) *Attorney, Agent, or Firm* — McDermott Will & Emery LLP

(57) ABSTRACT

An electrolytic capacitor includes an anode body, a dielectric layer formed on the anode body, and a conductive polymer layer covering at least a part of the dielectric layer. The conductive polymer layer includes a conductive polymer and a polymer dopant. The polymer dopant includes a first copolymer including: (A) a first unit derived from a first monomer having a sulfonate group; (B) a second unit derived from a second monomer having a carboxy group; and (C) a third unit derived from a third monomer having a hydroxy group.

20 Claims, 1 Drawing Sheet

(51) Int. Cl.
  *C08K 3/04* (2006.01)
  *C08L 33/14* (2006.01)
  *C08G 73/02* (2006.01)
  *H01G 9/00* (2006.01)
  *H01G 9/042* (2006.01)
  *H01G 9/048* (2006.01)
  *H01G 9/04* (2006.01)

(52) U.S. Cl.
  CPC ............ *C08L 33/14* (2013.01); *H01G 9/0032* (2013.01); *H01G 9/0036* (2013.01); *H01G 9/042* (2013.01); *H01G 9/15* (2013.01); *C08G 2261/1424* (2013.01); *C08G 2261/3223* (2013.01); *C08G 2261/512* (2013.01); *H01G 9/048* (2013.01); *H01G 2009/0014* (2013.01); *H01G 2009/0404* (2013.01)

(58) Field of Classification Search
  CPC ... H01G 2009/0014; H01G 2009/0404; C08G 73/0266; C08K 3/04
  See application file for complete search history.

(56) References Cited

U.S. PATENT DOCUMENTS

| | | | |
|---|---|---|---|
| 2008/0232037 A1* | 9/2008 | Biler | H01G 9/0036 361/529 |
| 2012/0104308 A1 | 5/2012 | Okamoto et al. | |
| 2016/0351340 A1* | 12/2016 | Uka | H01G 9/028 |
| 2016/0355636 A1* | 12/2016 | Sugihara | H01G 9/028 |
| 2017/0098510 A1* | 4/2017 | Uka | H01G 9/028 |
| 2018/0005759 A1* | 1/2018 | Uka | H01G 9/028 |
| 2018/0005760 A1* | 1/2018 | Uka | H01G 9/028 |
| 2018/0068802 A1* | 3/2018 | Uka | H01G 9/028 |

OTHER PUBLICATIONS

International Search Report of PCT application No. PCT/JP2016/001809 dated Jun. 14, 2016.
English Translation of Chinese Search Report dated Sep. 27, 2018 for the related Chinese Patent Application No. 201680030364.1.

* cited by examiner

US 10,388,463 B2

ELECTROLYTIC CAPACITOR AND CONDUCTIVE POLYMER DISPERSION

RELATED APPLICATIONS

This application is a continuation of the PCT International Application No. PCT/JP2016/001809, filed on Mar. 29, 2016, which claims the benefit of foreign priority of Japanese patent application No. 2015-109751, filed on May 29, 2015, the contents all of which are incorporated herein by reference.

BACKGROUND

1. Technical Field

The present disclosure relates to an electrolytic capacitor including a conductive polymer layer and to a conductive polymer dispersion useful for forming a conductive polymer layer.

2. Description of the Related Art

As small-sized, large capacitance, and low equivalent series resistance (ESR) capacitors, promising candidates are electrolytic capacitors including an anode body on which a dielectric layer is formed and a conductive polymer layer formed so as to cover at least a part of the dielectric layer. The conductive polymer layer includes a $\pi$-conjugated polymer and a dopant. With use of the dopant, high conductivity is imparted to the $\pi$-conjugated polymer.

As the dopant, a polymer dopant having a sulfonate group, such as polystyrenesulfonic acid is sometimes used. International Publication No. WO 2011/004833 suggests that a copolymer of a monomer having a sulfonate group and a monomer having chelating ability is used as a polymer dopant.

SUMMARY

An electrolytic capacitor according to a first aspect of the present disclosure includes an anode body, a dielectric layer formed on the anode body, and a conductive polymer layer covering at least a part of the dielectric layer. The conductive polymer layer includes a conductive polymer and a polymer dopant. The polymer dopant includes a first copolymer. The first copolymer includes (A) a first unit derived from a first monomer having a sulfonate group, (B) a second unit derived from a second monomer having a carboxy group, and (C) a third unit derived from a third monomer having a hydroxy group.

An electrolytic capacitor according to a second aspect of the present disclosure includes an anode body, a dielectric layer formed on the anode body, and a conductive polymer layer covering at least a part of the dielectric layer. The conductive polymer layer includes a conductive polymer and a polymer dopant. The polymer dopant includes a second copolymer and a third copolymer. The second copolymer includes (A1) a 1a-th unit derived from a 1a-th monomer having a sulfonate group, and (B) a second unit derived from a second monomer having a carboxy group. The third copolymer includes (A2) a 1b-th unit derived from a 1b-th monomer having a sulfonate group, and (C) a third unit derived from a third monomer having a hydroxy group.

A conductive polymer dispersion according to a third aspect of the present disclosure includes a conductive polymer, a polymer dopant, and a solvent. The polymer dopant includes a first copolymer. The first copolymer includes (A) a first unit derived from first monomer having a sulfonate group, (B) a second unit derived from a second monomer having a carboxy group, and (C) a third unit derived from a third monomer having a hydroxy group.

A conductive polymer dispersion according to a fourth aspect of the present disclosure includes a conductive polymer, a polymer dopant, and a solvent. The polymer dopant includes a second copolymer and a third copolymer. The second copolymer includes (A1) a 1a-th unit derived from a 1a-th monomer having a sulfonate group, and (B) a second unit derived from a second monomer having a carboxy group. The third copolymer includes (A2) a 1b-th unit derived from a 1b-th monomer having a sulfonate group, and (C) a third unit derived from a third monomer having a hydroxy group.

According to the present disclosure, it is possible to improve a restoration function as well as moisture resistance in an electrolytic capacitor.

DETAILED DESCRIPTION OF EMBODIMENT

Figure 1:
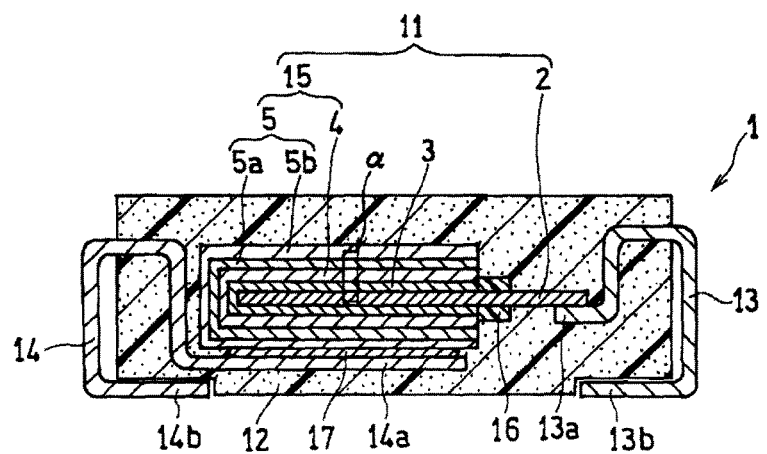
FIG. 1 is a schematic sectional view illustrating an electrolytic capacitor according to one exemplary embodiment of the present disclosure.

Even when a dopant described in International Publication No. WO 2011/004833 is used, it may be unable to obtain sufficient moisture resistance.

<Electrolytic Capacitor>

An electrolytic capacitor according to one exemplary embodiment of the present disclosure includes an anode body, a dielectric layer formed on the anode body, and a conductive polymer layer covering at least a part of the dielectric layer. The conductive polymer layer includes a conductive polymer and a polymer dopant.

The polymer dopant is a first polymer dopant containing a first copolymer including (A) a first unit derived from a first monomer having a sulfonate group, (B) a second unit derived from a second monomer having a carboxy group, and (C) a third unit derived from a third monomer having a hydroxy group.

The polymer dopant may be a second polymer dopant containing a second copolymer including (A1) a 1a-th unit derived from a 1a-th monomer having a sulfonate group, and (B) a second unit derived from a second monomer having a carboxy group, and a third copolymer including (A2) a 1b-th unit derived from a 1b-th monomer having a sulfonate group, and (C) a third unit derived from a third monomer having a hydroxy group.

By including a carboxy group in the polymer dopant, a restoration function of the electrolytic capacitor is improved. On the other hand, under existence of moisture, a hydrophilic group such as a sulfonate group or a carboxylate group, which is included in the polymer dopant, may be subjected to a hydration reaction, or redissolved in water. Accordingly, a change in property of the conductive polymer layer, such as volume expansion or a decrease in electrical conductivity occurs, so that an increase in ESR of the capacitor and a short-circuit easily occur. That is, moisture resistance is reduced.

Thus, further a hydroxy group is included in the polymer dopant. By impregnating an anode provided with a dielectric layer with a polymer dopant including a hydroxy group together with a sulfonate group and a carboxy group, and conducting a heating treatment to form a conductive polymer layer, a part of the carboxy group is intramolecularly or intermolecularly condensed with a part of the hydroxy group to form an ester. Accordingly, hydrophilicity of the conductive polymer layer is decreased. A remaining part of the carboxy group is included in the conductive polymer layer as it is. Thus, moisture resistance can be improved while the restoration function is improved.

The hydroxy group may be included in the polymer dopant (first polymer dopant) by forming a copolymer (first copolymer) of a third monomer having a hydroxy group with the first monomer having a sulfonate group and the second monomer having a carboxy group. The hydroxy group may also be included in the polymer dopant (second polymer dopant) by forming a copolymer (third copolymer) of a third monomer having a hydroxy group with the 1b-th monomer having a sulfonate group. In a latter case, a copolymer (second copolymer) of the 1a-th monomer having a sulfonate group and the second monomer having a carboxy group is further included in the second polymer dopant.

Figure 2:
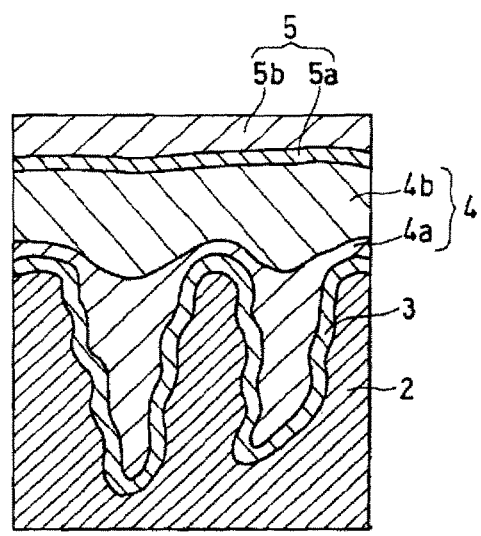
FIG. 2 is an enlarged view illustrating an area surrounded by a solid line a in FIG. 1.

The electrolytic capacitor according to one exemplary embodiment of the present disclosure will be described in detail with reference to FIG. 1 and FIG. 2.

Electrolytic capacitor 1 includes capacitor element 11, resin outer packing 12 that seals capacitor element 11, and anode terminal 13 and cathode terminal 14 that are exposed to the outside of resin outer packing 12. Capacitor element 11 includes foil-like or plate-like anode body 2, dielectric layer 3 covering anode body 2, and cathode portion 15 covering dielectric layer 3. Anode terminal 13 is electrically connected to anode body 2, and cathode terminal 14 is electrically connected to cathode portion 15. Resin outer packing 12 has an almost rectangular parallelepiped outer shape, and therefore electrolytic capacitor 1 also has an almost rectangular parallelepiped outer shape.

Anode body 2 and cathode portion 15 are opposite to each other with dielectric layer 3 interposed between anode body 2 and cathode portion 15. Cathode portion 15 includes conductive polymer layer 4 covering dielectric layer 3 and cathode layer 5 covering conductive polymer layer 4. Cathode layer 5 shown in the drawings has a two-layer structure, and includes carbon layer 5a in contact with conductive polymer layer 4 and silver paste layer 5b covering a surface of carbon layer 5a.

Anode body 2 has an area on which insulating separation part 16 is formed so as to zonally cover a surface of anode body 2, the area being in an end of anode body 2 that protrudes from cathode portion 15 and being adjacent to cathode portion 15. Thus a contact between cathode portion 15 and anode body 2 is restricted at the area. The end of anode body 2 that protrudes from cathode portion 15 is electrically connected to first end 13a of anode terminal 13 by welding or the like. Meanwhile, cathode layer 5 formed as an outermost layer of cathode portion 15 is electrically connected to first end 14a of cathode terminal 14 via conductive adhesive material 17 (e.g., a mixture of a thermosetting resin and metal particles). Second end 13b of anode terminal 13 and second end 14b of cathode terminal 14 are drawn out from side surfaces of resin outer packing 12 which are different from each other, respectively. And second end 13b of anode terminal 13 and second end 14b of cathode terminal 14 each extend to one main flat surface (lower surface in FIG. 1) in an exposed state. The exposed parts of the terminals (anode terminal 13 and cathode terminal 14) on the flat surface are used for, for example, solder connections to a substrate (not shown in the drawings) on which electrolytic capacitor 1 is to be mounted.

Dielectric layer 3 is formed on a part of a surface of a conductive material constituting anode body 2. Specifically, dielectric layer 3 can be formed by anodizing the surface of the conductive material constituting anode body 2. Accordingly, dielectric layer 3 is formed along a surface (including an inner wall surface of pores or pits of an inner surface) of anode body 2 as shown in FIG. 2.

In the example shown in the drawing, first conductive polymer layer 4a is formed so as to cover dielectric layer 3, and second conductive polymer layer 4b is formed so as to cover first conductive polymer layer 4a. A structure of the conductive polymer layer, however, is not particularly limited, and may be a single-layer structure or a multi-layer structure having two or more layers. First conductive polymer layer 4a does not necessarily cover whole (a whole surface of) dielectric layer 3 and is satisfactory as long as first conductive polymer layer 4a is formed so as to cover at least a part of dielectric layer 3. Similarly, second conductive polymer layer 4b does not necessarily cover whole (a whole surface of) first conductive polymer layer 4a and is satisfactory as long as second conductive polymer layer 4b is formed so as to cover at least a part of first conductive polymer layer 4a. In the example shown in the drawing, first conductive polymer layer 4a and second conductive polymer layer 4b are shown as conductive polymer layer 4. In general, a layer including a conductive polymer, such as first conductive polymer layer 4a, second conductive polymer layer 4b, and conductive polymer layer 4, may be referred to as a solid electrolyte layer.

Dielectric layer 3 is formed along the surface of anode body 2, and therefore irregularities are formed on a surface of dielectric layer 3 in accordance with a shape of the surface of anode body 2. First conductive polymer layer 4a is preferred to be formed so as to fill such irregularities of dielectric layer 3.

Hereinafter, a configuration of the electrolytic capacitor is described in more detail.

(Anode Body)

A conductive material having a large surface area can be used as anode body 2. Examples of the conductive material may include a valve metal, an alloy including a valve metal, and a compound including a valve metal. These materials can be used alone or in combination of two or more materials. As the valve metal, there can be preferably used, for example, titanium, tantalum, aluminum and/or niobium. These metals are suitable as a constituent material of anode body 2 because oxides of these metals have a high dielectric constant. Examples of anode body 2 include one obtained by roughening a surface of a base material (e.g., a foil-like or plate-like base material) formed of a conductive material, and a molded body that is prepared from particles of a conductive material or a sintered body obtained by sintering the molded body.

(Dielectric Layer)

Dielectric layer 3 is formed by anodizing, through an anodizing treatment or the like, the conductive material on a surface of anode body 2. Thus, dielectric layer 3 includes an oxide of the conductive material (particularly, the valve metal). For example, when tantalum is used as the valve metal, dielectric layer 3 includes $Ta_2O_5$, and when aluminum is used as the valve metal, dielectric layer 3 includes $A_2O_3$. Dielectric layer 3 is not limited to these examples, and a layer is acceptable as the dielectric layer as long as the layer functions as a dielectric body. When anode body 2 is a foil-like or plate-like anode body, and a surface of the anode body is roughened, dielectric layer 3 is formed along an inner wall surface of pores or pits at a surface of anode body 2 as shown in FIG. 2.

(Conductive Polymer Layer)

Conductive polymer layer 4 is satisfactory as long as the conductive polymer layer is formed so as to cover at least a part of dielectric layer 3, and the conductive polymer layer may be formed so as to cover a whole surface of dielectric layer 3. Anode body 2 has a large surface area, and dielectric layer 3 is formed not only on an outer surface but also on a more inside surface, i.e., an inner wall surface of pores or pits of the anode body. It is preferred that conductive polymer layer 4 be also formed on dielectric layer 3 that has been formed on the inner wall surface to increase coverage by conductive polymer layer 4.

Conductive polymer layer 4 includes a conductive polymer and a dopant. The dopant may be included in conductive polymer layer 4 in a state of being doped in the conductive polymer. The dopant may also be included in conductive polymer layer 4 in a state of being bonded to the conductive polymer. Conductive polymer layer 4 may include at least a first polymer dopant or a second polymer dopant as the dopant and may further include a dopant (e.g., a low-molecular-weight dopant and a third polymer dopant as described later) other than the first/second polymer dopant.

(Conductive Polymer)

As the conductive polymer, there can be used, for example, a publicly known polymer used for an electrolytic capacitor, such as a π-conjugated conductive polymer. Examples of such a conductive polymer include polymers having, as a basic skeleton, for example, polypyrrole, polythiophene, polyfuran, polyaniline, polyacetylene, polyphenylene, polyphenylene vinylene, polyacene, and/or polythiophene vinylene.

Such a polymer includes a homopolymer, a copolymer of two or more kinds of monomers, and derivatives (e.g., a substitute having a substituent) of these polymers. For example, polythiophene includes poly(3,4-ethylenedioxythiophene) and the like. Such a conductive polymer has high conductivity and an excellent ESR characteristics. These conductive polymers may be used alone or in combination of two or more conductive polymers. A weight average molecular weight of the conductive polymer is not particularly limited, and ranges, for example, from 1,000 to 1,000,000, inclusive.

The conductive polymer can be obtained by, for example, polymerizing a raw material of the conductive polymer (a precursor of the conductive polymer). The conductive polymer that is bonded to or doped with the first polymer dopant can be obtained by polymerizing a precursor of the conductive polymer under existence of the first polymer dopant. Examples of the precursor of the conductive polymer may include a monomer that constitutes the conductive polymer and/or an oligomer in which some monomers are linked to each other. As a polymerization method, both chemical oxidation polymerization and electrolytic oxidation polymerization can be employed.

The conductive polymer bonded to or doped with the second polymer dopant is obtained by performing polymerization by use of a polymerization liquid containing the second copolymer, the third copolymer, and a precursor of the conductive polymer.

A conductive polymer P2 including the second copolymer and a conductive polymer P3 including the third copolymer may be each polymerized, and the mixed. That is, the conductive polymer P2 including the second copolymer is polymerized by use of a polymerization liquid containing the second copolymer and the precursor of the conductive polymer. Separately, the conductive polymer P3 including the third copolymer is polymerized by use of the third copolymer and the precursor of the conductive polymer. Finally, by mixing the conductive polymer P2 and the conductive polymer P3 at a predetermined ratio, a conductive polymer bonded to or doped with the second polymer dopant can be obtained.

In particular, it is preferable that a conductive polymer bonded to or doped with the second polymer dopant is obtained by a latter method from a viewpoint of facilitating adjustment of a ratio of the first (1a-th and 1b-th) unit, the second unit, and the third unit included in the conductive polymer layer 4. Here, kinds of precursors of the conductive polymers to be used in polymerization of the conductive polymer P2 and the conductive polymer P3 may be identical to each other, or different from each other.

The electrolytic oxidation polymerization proceeds by, for example, applying to a polymerization liquid containing a raw material of the conductive polymer a constant current ranging from 0.05 mA/cm$^2$ to 10 mA/cm$^2$, inclusive, or a constant voltage ranging from 0.5 V to 10 V, inclusive. A catalyst may be added to the polymerization liquid in order to accelerate the polymerization. As the catalyst, ferrous sulfate, ferric sulfate or the like can be used. The electrolytic oxidation polymerization may be performed under existence of the first/second polymer dopant as required.

The chemical oxidation polymerization proceeds by mixing a raw material of the conductive polymer with an oxidant. As the oxidant used for the chemical oxidation polymerization, there can be used, for example, a persulfate (e.g., ammonium persulfate, sodium persulfate, and potassium persulfate) and a metal sulfonate. At this time, ferrous sulfate and ferric sulfate may be used as a catalyst. The chemical oxidation polymerization may be performed under existence of the first/second polymer dopant as required.

For the polymerization, a solvent (first solvent) for dissolving or dispersing a raw material of the conductive polymer (and the first/second dopant) may be used as required. Examples of the first solvent include water, a water-soluble organic solvent, and a mixture of water and a water-soluble organic solvent. The water-soluble organic solvent is not particularly limited, and examples of the water-soluble organic solvent include acetone, tetrahydrofuran, methanol, ethanol, isopropanol, and/or N-methyl-2-pyrrolidone. When the conductive polymer is synthesized with use of the first solvent, the conductive polymer can be obtained in a state of being dispersed in the first solvent. Then, it is preferred to remove, as required, impurities such as an unreacted monomer, an undoped or excessive dopant, a persulfate, and a catalyst by, for example, dialysis or an ion exchange method.

The conductive polymer may be synthesized in advance before attached to the anode body including the dielectric layer. Alternatively, in the case of the chemical oxidation polymerization, the polymerization of the conductive polymer can be performed under existence of the anode body including the dielectric layer.

(First Polymer Dopant)

The first polymer dopant includes a first copolymer of the first monomer, the second monomer, and the third monomer. The first monomer has a polymerizable group and a sulfonate group. The second monomer has a polymerizable group and a carboxy group. The third monomer has a polymerizable group and a hydroxy group.

The copolymer may be any of a random copolymer of the first to third monomers, a block copolymer, and a graft copolymer. The copolymer, however, is preferred to be a random copolymer from a viewpoint of acquiring a uniform restoration function over the conductive polymer layer.

The anionic group (specifically sulfonate group, carboxy group and hydroxy group) in the first polymer dopant is not particularly limited as long as the anionic group can generate an anion in a dissociated state, and the anionic group may be a salt of the anionic group (for example, a metal salt (e.g., an alkali metal salt) such as a sodium salt, an ammonium salt, a sulfonium salt, and a phosphonium salt), or an ester of the anionic group. The present disclosure also includes an electrolytic capacitor including the first polymer dopant in which the anionic group forms a salt or an ester.

In the first monomer, the second monomer, and the third monomer, the polymerizable group is preferred to be a radically polymerizable group and is, for example, a carbon-carbon double bond and a carbon-carbon triple bond.

Examples of the first monomer include a vinyl monomer having a sulfonate group and a diene monomer (e.g., isoprenesulfonic acid) having a sulfonate group. Examples of the vinyl monomer having a sulfonate group include aliphatic vinyl monomers having a sulfonate group, such as vinylsulfonic acid, allylsulfonic acid, and 2-acrylamido-2-methylpropanesulfonic acid; and aromatic vinyl monomers having a sulfonate group, such as styrenesulfonic acid and a substitute of styrenesulfonic acid (e.g., vinyltoluenesulfonic acid).

The first monomer includes a salt of the vinyl monomer having a sulfonate group or the diene monomer having a sulfonate group (for example, a metal salt (e.g., an alkali metal salt) such as a sodium salt, an ammonium salt, a sulfonium salt, and a phosphonium salt). The first polymer dopant may include one first unit or may include two or more first units. As the first unit, an aromatic vinyl unit having a sulfonate group (including a salt of the aromatic vinyl unit) is preferred.

From a viewpoint of moisture resistance, it is preferable that the second monomer has a polymerizable group, and a carboxy group represented by formula (1);

—CO—R$^1$—COOH  (1)

(wherein R$^1$ represents an aliphatic hydrocarbon group having 1 to 8 carbon atoms, an aromatic group, or a divalent group —OR$^2$—, R$^2$ representing an aliphatic hydrocarbon group having 1 to 8 carbon atoms or an aromatic group).

Examples of the aliphatic hydrocarbon group represented by R$^1$ include chain hydrocarbon groups (e.g., $C_{2-8}$ alkylene groups such as 1,2-ethylene, propylene, and trimethylene; $C_{1-8}$ alkylidene groups such as methylene and ethylidene; and $C_{2-8}$ alkenylene groups such as vinylene, 1-propene-1, 3-diyl) and cyclic aliphatic hydrocarbon groups (e.g., $C_{4-8}$ cycloalkylene groups such as cyclohexane-1,4-diyl). From a viewpoint of suppressing variety in molecular weight of the polymer dopant to increase a yield of the first polymer dopant, for example, an alkylene group, an alkylidene group, and a cycloalkylene group are preferred among the aliphatic hydrocarbon groups. Especially, a $C_{2-6}$ alkylene group (particularly, a $C_{2-4}$ alkylene group and the like), a $C_{1-6}$ alkylidene group (particularly, a $C_{1-4}$ alkylidene group and the like), a $C_{5-8}$ cycloalkylene group (particularly, a $C_{5-6}$ cycloalkylene group and the like) are preferred, for example. The aliphatic hydrocarbon group may have a substituent such as a hydroxyl group or an alkoxy group.

Examples of the aromatic group represented by R$^1$ include $C_{6-12}$ arylene groups such as phenylene, tolylene, naphthylene and biphenylene (preferably $C_{6-10}$ arylene groups). An aromatic ring of an arylene group may have a substituent (e.g., an alkyl group such as a methyl group, a hydroxyl group, and an alkoxy group).

Bonding positions of the cyclic aliphatic hydrocarbon group or the aromatic group, which is represented by R$^1$, with two carbonyl groups adjacent to R$^1$ may be on any carbon atom of a hydrocarbon ring (an alicyclic hydrocarbon ring or an aromatic ring) constituting R$^1$ according to a number of atoms in the ring. For example, when a carbon atom of the hydrocarbon ring that is bonded to one carbonyl group is a first position, a carbon atom bonded with the other carbonyl group may be a second position, a third position, or a fourth position, especially preferably the second position or the third position.

In the divalent group —OR$^2$— represented by R$^1$, the aliphatic hydrocarbon group and the aromatic group that are represented by R$^2$ can be selected from the aliphatic hydrocarbon groups and the aromatic groups exemplified for R$^1$, respectively. From a viewpoint of increasing hydrophilicity, R$^2$ is preferably a $C_{2-6}$ alkylene group or a $C_{1-6}$ alkylidene group, further preferably a $C_{2-4}$ alkylene group or a $C_{1-4}$ alkylidene group, particularly preferably a $C_{2-3}$ alkylene group or a $C_{1-3}$ alkylidene group.

The second monomer has to have at least the polymerizable group and a carboxy group, and may have the polymerizable group, a carboxy group, and a linking group that links these groups. Examples of the second monomer include a vinyl monomer or diene monomer having a carboxy group, and a vinyl monomer or diene monomer having a carboxy group and the linking group. The first polymer dopant may include one second unit or may include two or more first units. The second monomer may have two or more carboxy groups. Here, the carboxy groups may have the same structure, or different structures.

The linking group is not particularly limited, and may be an aliphatic hydrocarbon group (e.g., an alkylene group and an alkylidene group) or an aromatic group (e.g., an arylene group) as exemplified for R$^1$ or may be a divalent group having a hetero atom such as an oxygen atom, a nitrogen atom, and/or a sulfur atom.

From a viewpoint of facilitating linking of the polymerizable group with a carboxy group represented by formula (1), the linking group is preferably, for example, a carbonyl-alkylenedioxy group (—CO—O—R$^a$—O—) and a carbonyl-poly(oxyalkylene)oxy group (—CO—(O—R$^b$)$_n$—O—). Here, R$^a$ represents an alkylene group (preferably a $C_{2-3}$ alkylene group) as exemplified for R$^1$, and R$^b$ represents a $C_{2-3}$ alkylene group such as ethylene or propylene. A number of repeating oxyalkylene groups, or n is an integer of 2 to 10. Examples of the second monomer having such a linking group include an ester of a polymerizable unsaturated carboxylic acid such as (meth)acrylic acid, maleic acid, or fumaric acid and a dicarboxylic acid corresponding to the carboxy group with an alkylene glycol (HO—R$^a$—OH) or a polyalkylene glycol (H—(O—R$^b$)$_n$—OH).  In the present specification, acrylic acid and methacrylic acid are collectively referred to as (meth)acrylic acid.

Particularly, it is considered that the second monomer having an oxy $C_{2-3}$ alkylene group or a polyoxy $C_{2-3}$ alkylene group is high in hydrophilicity and is thus high in solubility and dispersibility in water. Therefore, use of such a second monomer facilitates synthesis of the polymer dopant to improve the yield of the polymer dopant and also facilitates suppression of variety in molecular weight of the polymer dopant.

For example, the second unit having an oxyalkylene group or a polyoxyalkylene group is preferably a unit represented by formula (1a);

$$-CH_2-CR^3R^4- \quad (1a)$$

(wherein $R^3$ represents a hydrogen atom or a methyl group, and $R^4$ represents $-CO-(OCH_2CH_2)_{n1}-O-CO-R^{1a}-COOH$, n1 representing an integer of 1 to 10, $R^{1a}$ representing an aliphatic hydrocarbon group having 1 to 8 carbon atoms, or an aromatic group); or
a unit represented by formula (1b);

$$-CHR^5-CHR^6- \quad (1b)$$

(wherein $R^5$ represents a carboxy group, or $-CO-(OCH_2CH_2)_{n2}-O-CO-R^{1b}-COOH$, and $R^6$ represents $CO-(OCH_2CH_2)_{n3}-O-CO-R^{1c}-COOH$, n2 and n3 each representing an integer of 1 to 10, $R_{1b}$ and $R^{1c}$ each representing an aliphatic hydrocarbon group having 1 to 8 carbon atoms, or an aromatic group).

$R^{1a}$, $R_{1b}$ and $R^{1c}$ each correspond to $R^1$ of carboxy group (1). The aliphatic hydrocarbon group and the aromatic group that are represented by $R^{1a}$, $R^{1b}$, and $R^{1c}$ can be selected from the aliphatic hydrocarbon groups and the aromatic groups exemplified for $R^1$, respectively. Numbers of repeating oxyethylene groups, or n1, n2, and n3 are each preferably an integer of 1 to 5, more preferably an integer of 1 to 3.

When the second unit has an ester bond ($-CO-O-$), it is possible to increase polarity of the polymer dopant, so that a restoration property of the dielectric layer can be further improved. Further, the polymer dopant can be easily and stably synthesized.

From a viewpoint of moisture resistance, it is preferable that the third monomer has a polymerizable group, and a hydroxy group represented by formula (2a):

$$-(O-R^7)_n-OH \quad (2a)$$

(wherein $R^7$ represents an aliphatic hydrocarbon group having 2 to 10 carbon atoms, and n represents 1 to 10); or
a hydroxy group represented by formula (2b):

$$-NH-R^8-OH \quad (2b)$$

(wherein $R^8$ represents an aliphatic hydrocarbon group having 1 to 10 carbon atoms).

Examples of the aliphatic hydrocarbon group represented by $R^7$ in formula (2a) include chain hydrocarbon groups (e.g., $C_{2-10}$ alkylene groups such as ethylene, propylene, butylene, and trimethylene; and $C_{2-10}$ alkylidene groups such as ethylidene, propylidene, and butylidene) and cyclic aliphatic hydrocarbon groups (e.g., $C_{4-8}$ cycloalkylene groups such as cyclohexane-1,4-diyl). From a viewpoint of suppressing variations in molecular weight of the polymer dopant to increase a yield, $R^7$ is preferably a $C_{2-10}$ alkylene group, more preferably a $C_{2-4}$ alkylene group. The aliphatic hydrocarbon group may have one or more substituents such as a hydroxyl group and an alkoxy group.

Examples of the aliphatic hydrocarbon group represented by $R^8$ in formula (2b) may include aliphatic hydrocarbon groups identical to those shown as $R^7$ as an example. In particular, from a similar viewpoint, $R^7$ is preferably a $C_{2-10}$ alkylene group, more preferably a $C_{2-4}$ alkylene group.

The third monomer may have at least a polymerizable group and a hydroxy group, and may have a polymerizable group, a hydroxy group, and a linking group that links these groups. Examples of the linking group may include linking groups similar to those shown as an example in the second monomer.

A ratio r1 of a total of the second unit and the third unit to a total of the first unit, the second unit, and the third unit that are included in the first copolymer is preferably from 5 mol % to 50 mol %, inclusive, more preferably from 10 mol % to 40 mol %, inclusive, especially preferably from 15 mol % to 25 mol %, inclusive. When the ratio of the total of the second and third units falls within such a range, moisture resistance is further improved by esterification of a carboxy group and a hydroxy group, and the restoration function of the dielectric layer by the conductive polymer layer is also further improved.

From a viewpoint of moisture resistance and the restoration function, a ratio of the second unit to a total of the second unit and the third unit that are included in the first copolymer is preferably from 20 mol % to 80 mol %, inclusive, more preferably from 40 mol % to 60 mol %, inclusive.

The first copolymer may include a fourth unit other than the first unit, the second unit, and the third unit. The first copolymer may include one fourth unit, or may include two or more fourth units. However, in the first polymer dopant, a total ratio of the first unit, the second unit, and the third unit is preferably higher than a ratio of the fourth unit.

A fourth monomer corresponding to the fourth unit is not particularly limited as long as the fourth monomer is a monomer copolymerizable with any of the first monomer, the second monomer, and the third monomer. Examples of the fourth monomer include polymerizable unsaturated carboxylic acids such as meth(acrylic) acid, maleic acid, and fumaric acid, or derivatives (e.g., esters, amides, and imides) of the polymerizable unsaturated carboxylic acids.

The first polymer dopant can be synthesized by, for example, polymerization (e.g., radical polymerization) of the first monomer, the second monomer, and the third monomer, and the fourth monomer as necessary. The polymerization can be performed in a solvent (second solvent). Examples of such a second solvent include water, a water-soluble organic solvent (e.g., the water-soluble organic solvents exemplified for the first solvent), and a mixture of water and the water-soluble organic solvent.

Specifically, the first polymer dopant can be synthesized by housing in a reaction vessel a monomer solution containing the second solvent, the first monomer, the second monomer, and the third monomer, and the fourth monomer as necessary, removing oxygen from the reaction vessel, and then adding a polymerization initiator to allow progress of polymerization at a predetermined temperature. The monomer solution may also contain a molecular weight modifier (e.g., a thiol compound and a quinone compound) as necessary. From the view point of avoiding a rapid polymerization reaction, the monomers or the monomer solution may be charged into the reaction vessel over a plurality of times.

The polymerization initiator is not particularly limited, and there can be used, for example, a peroxide, a persulfate (e.g., ammonium persulfate and potassium persulfate), and an azo compound. Examples of the peroxide include hydrogen peroxide, cumene hydroperoxide, and di-t-butyl peroxide. Examples of the azo compound include 2,2'-azobis(4-methoxy-2,4-dimethylvaleronitrile), 2,2'-azobis2,4-dimethylvaleronitrile), and 2,2'-azobisisobutyronitrile.

The first polymer dopant may also include a polymer other than the first copolymer, e.g. a polyestersulfonic acid, a phenolsulfonic acid novolac resin, a homopolymer of the first monomer, the second monomer, or the third monomer, a copolymer of the first monomer with a copolymerizable monomer different from the second monomer (e.g. a vinyl monomer having a phosphate group, a phosphonate group and/or a carboxy group), a copolymer of the first monomer with a copolymerizable monomer different from the second monomer and the third monomer.

(Second Polymer Dopant)

The second polymer dopant includes a second copolymer of the 1a-th monomer and the second monomer, and a third copolymer of the 1b-th monomer and the third monomer. Examples of the 1a-th and 1b-th monomers include a monomer identical to the above-mentioned first monomer. The 1a-th monomer and the 1b-th monomer may be identical to each other, or different from each other. Hereinafter, the first monomer, the 1a-th monomer and the 1b-th monomer may be collectively referred to as a "first monomer". Examples of the second monomer and the third monomer include monomers identical to the above-mentioned second monomer and third monomer, respectively.

For example, a ratio of the second unit to a total of the 1a-th unit and the second unit that are included in the second copolymer is preferably from 5 mol % to 50 mol %, inclusive, more preferably from 10 mol % to 40 mol %, inclusive, especially preferably from 15 mol % to 25 mol %, inclusive. A ratio r3 of the third unit to a total of the 1b-th unit and the third unit that are included in the third copolymer is preferably from 5 mol % to 50 mol %, inclusive, more preferably from 10 mol % to 40 mol %, inclusive, especially preferably from 15 mol % to 25 mol %, inclusive. When the ratios of the second unit and the third unit each fall within the above-mentioned range, moisture resistance is further improved by esterification of a carboxy group and a hydroxy group, and the restoration function of the dielectric layer by the conductive polymer layer is also further improved.

From a viewpoint of moisture resistance and the restoration function, a ratio of the second unit to a total of the second unit included in the second copolymer and the third unit included in the third copolymer is preferably from 20 mol % to 80 mol %, inclusive, more preferably from 40 mol % to 60 mol %, inclusive.

The second and third copolymers may include a fourth unit other than the 1a-th unit, the 1b-th unit, the second unit and the third unit. Each copolymer may include one fourth unit, or may include two or more fourth units. However, in the second polymer dopant, a total ratio of the 1a-th unit, the 1b-th unit, the second unit and the third unit is preferably higher than a ratio of the fourth unit. Examples of the fourth unit include a unit identical to the above-mentioned fourth unit.

The second polymer dopant can be obtained by, for example, mixing the second copolymer obtained by polymerizing the 1a-th monomer and the second monomer, and the fourth monomer as necessary, with the third copolymer obtained by polymerizing the 1b-th monomer and the third monomer, and the forth monomer as necessary. The second polymer dopant can also be obtained by synthesizing the conductive polymer P2 including the second copolymer and the conductive polymer P3 including third copolymer, respectively, and then mixing both the conductive polymers. The polymerization can be performed by a method similar to that described above.

The second polymer dopant may include a polymer other than the second and a third polymers. Examples of the polymer other than the second and a third polymers include those similar to polymers other than the first polymer as shown with regard to the first polymer dopant.

(Others)

A ratio of the first/second polymer dopant included in conductive polymer layer 4 is preferably from 10 parts by mass to 1,000 parts by mass, inclusive, more preferably from 50 parts by mass to 200 parts by mass, inclusive with respect to 100 parts by mass of the conductive polymer.

Conductive polymer layer 4 may further include other dopants (low-molecular-weight dopant and/or third polymer dopant). A ratio of the other dopants is preferably 5 parts by mass or less with respect to 100 parts by mass of the first/second polymer dopant.

When conductive polymer layer 4 includes first conductive polymer layer 4a and second conductive polymer layer 4b, it is preferable that at least second conductive polymer layer 4b includes the first/second polymer dopant. For example, first conductive polymer layer 4a may include the low-molecular-weight dopant and/or the third polymer dopant, and second conductive polymer layer 4b may include the first/second polymer dopants. Various kinds of dopants may be used alone, or in combination of two or more thereof.

As the low-molecular-weight dopant, there can be used a compound (low-molecular-weight compound (monomer compound)) having an anionic group such as a sulfonate group, a carboxy group, a phosphate group ($-O-P(=O)(-OH)_2$), and/or a phosphonate group ($-P(=O)(-OH)_2$). As such a compound, there can be used, for example, a cyclic compound in which an anionic group is bonded to an aromatic ring (e.g. a $C_{6-14}$ aromatic ring) of benzene, naphthalene, anthracene, or the like, or to a fused ring of an aromatic ring (e.g. a $C_{6-14}$ aromatic ring) and an aliphatic ring. As the anionic group, a sulfonate group is preferred, and a combination of the sulfonate group with an anionic group other than the sulfonate group is also acceptable. The aromatic ring and/or aliphatic ring constituting the cyclic compound may also include a substituent (e.g. an alkyl group such as a methyl group, and an oxo group ($=O$)), other than the anionic group. Specific examples of such a compound include benzenesulfonic acid, alkylbenzenesulfonic acids such as p-toluenesulfonic acid, naphthalenesulfonic acid, and anthraquinonesulfonic acid.

As the third polymer dopant, there can be used, for example, a polymer compound having an anionic group such as a sulfonate group, a phosphate group ($-O-P(=O)(-OH)_2$), and/or a phosphonate group ($-P(=O)(-OH)_2$). Among the anionic groups, a sulfonate group is preferred. As a polymeric dopant having a sulfonate group, there can be exemplified a homopolymer or a copolymer of a monomer having a sulfonate group (e.g. a vinyl monomer having a sulfonate group and a diene monomer having a sulfonate group, such as isoprenesulfonic acid). The vinyl monomer having a sulfonate group can be selected from those exemplified for the first polymer dopant. The copolymer may be a copolymer formed of two or more kinds of monomers having a sulfonate group or a copolymer formed of a monomer having a sulfonate group and another monomer.

In the low-molecular-weight dopant and the third polymer dopant, the anionic group is not particularly limited as long as the anionic group can generate an anion in a dissociated state, and the anionic group may be a salt or ester of the above-mentioned anionic group.

A whole thickness (average thickness) of conductive polymer layer 4 ranges, for example, from 6 μm to 150 μm, inclusive, preferably from 10 μm to 60 μm, inclusive.

When first conductive polymer layer 4a and second conductive polymer layer 4b are formed, an average thickness of second conductive polymer layer 4b ranges, for example, from 5 µm to 100 µm, inclusive, or from 5 µm to 50 µm, inclusive. A ratio of the average thickness of second conductive polymer layer 4b to an average thickness of first conductive polymer layer 4a ranges, for example, 5 or more, or 10 or more.

Conductive polymer layer 4 may further include, as necessary, a publicly known additive and/or a publicly known conductive material (e.g. a conductive inorganic material such as manganese dioxide; and/or a TCNQ complex salt) other than the conductive polymer. A layer for improving adhesion may be interposed between dielectric layer 3 and conductive polymer layer 4 or between first conductive polymer layer 4a and second conductive polymer layer 4b. First conductive polymer layer 4a and second conductive polymer layer 4b may each be formed of one layer or may be formed of a plurality of layers.

(Cathode Layer)

Carbon layer 5a is satisfactory as long as the carbon layer has conductivity, and the carbon layer can be configured, for example, with use of a conductive carbon material such as graphite. For silver paste layer 5b, for example, there can be used a composition including a silver powder and a binder resin (e.g., an epoxy resin). A configuration of cathode layer 5 is not limited to this example, and it is sufficient if the cathode layer has a function of power collection. Anode terminal 13 and cathode terminal 14 can be configured to include, for example, a metal such as copper or a copper alloy. As a material of resin outer packing 12, there can be used, for example, an epoxy resin.

The electrolytic capacitor of the present disclosure is not limited to the electrolytic capacitor having the structure described above, and can be various electrolytic capacitors. Specifically, the present disclosure can also be applied to, for example, a wound electrolytic capacitor and an electrolytic capacitor including a metal powder sintered body as the anode body.

<Method for Producing Electrolytic Capacitor>

An electrolytic capacitor can be produced through following four steps. A first step is preparing anode body 2. A second step is forming dielectric layer 3 on anode body 2. And a third step is treating dielectric layer 3-formed anode body 2 with a treatment liquid containing a conductive polymer and a dopant (e.g., first/second polymer dopant). The method for producing an electrolytic capacitor may further include a step (fourth step) of forming cathode layer 5. Hereinafter, the steps will be described in detail.

(First Step)

In the first step, anode body 2 is formed by a publicly known method according to a kind of anode body 2. Anode body 2 can be prepared by, for example, roughening a surface of a foil-like or plate-like base material formed of a conductive material. The roughening is satisfactory as long as irregularities are formed on the surface of the base material and may be performed, for example, by subjecting the surface of the base material to etching (e.g., electrolytic etching) or by depositing particles of the conductive material on the surface of the base material by use of a gas phase method such as vapor deposition.

(Second Step)

In the second step, dielectric layer 3 is formed on anode body 2. Dielectric layer 3 is formed by anodizing a surface of anode body 2. The anodization can be performed by a publicly known method, for example, an anodizing treatment. The anodizing treatment can be performed by, for example, immersing anode body 2 in an anodizing liquid to impregnate, with the anodizing liquid, the surface (a more inside surface, i.e., an inner wall surface of pores or pits) of anode body 2, and applying a voltage between anode body 2 as an anode and a cathode immersed in the anodizing liquid. As the anodizing liquid, it is preferred to use, for example, an aqueous solution of phosphoric acid, an aqueous solution of ammonium phosphate, or an aqueous solution of ammonium adipate.

(Third Step)

In the third step, conductive polymer layer 4 is formed with use of a treatment liquid containing a conductive polymer and the first/second polymer dopant. The treatment liquid may also contain another dopant as necessary. Alternatively, first conductive polymer layer 4a and second conductive polymer layer 4b may be formed with use of a first treatment liquid and a second treatment liquid that are different in composition (or in concentration or viscosity of the conductive polymer). First conductive polymer layer 4a may be formed with use of the first treatment liquid containing the other dopant, and second conductive polymer layer 4b may be formed with use of the second treatment liquid containing the first/second polymer dopant so as to cover first conductive polymer layer 4a.

In the third step, for example, dielectric layer 3-formed anode body 2 is immersed in the treatment liquid or the treatment liquid is dropwise added to dielectric layer 3-formed anode body 2. The treatment liquid is impregnated by immersion or dropwise addition, into the surface (a more inside surface, i.e., an inner wall surface of pores or pits on which dielectric layer 3 has been formed) of dielectric layer 3-formed anode body 2. After the impregnation of the dispersion, anode body 2 is heated. Due to the heating, the conductive polymer and the first/second polymer dopant are deposited on the surface of dielectric layer 3-formed anode body 2, and a part of the carboxy group is intramolecularly/intermolecularly condensed with a part of the hydroxy group to form an ester.

Preferably, a conductive polymer dispersion is used as a treatment liquid. The conductive polymer dispersion contains the conductive polymer, the first/second dopants, and a solvent (third solvent). The use of such a conductive polymer dispersion enables easy formation of conductive polymer layer 4 and easy acquisition of conductive polymer layer 4 stable in quality. The present disclosure also includes such a conductive polymer dispersion.

(Conductive Polymer Dispersion)

In the conductive polymer dispersion, the conductive polymer and the first/second polymer dopant are dispersed in the third solvent. A ratio of the first/second polymer dopant contained in the conductive polymer dispersion is preferably from 10 parts by mass to 1,000 parts by mass, inclusive, more preferably from 50 parts by mass to 200 parts by mass, inclusive, with respect to 100 parts by mass of the conductive polymer.

When the conductive polymer dispersion includes the second polymer dopant, and is obtained by mixing conductive polymer dispersion liquid 2A containing the conductive polymer and the second copolymer with conductive polymer dispersion liquid 2B containing the conductive polymer and the third copolymer, conductive polymer dispersion liquid 2A and conductive polymer dispersion liquid 2B may be mixed with each other in such a manner that a ratio of the second unit to a total of the second unit included in the second copolymer and the third unit included in the third copolymer is preferably from 20 mol % to 80 mol %, inclusive, more preferably from 40 mol % to 60 mol %, inclusive.

As the third solvent, there can be exemplified water, an organic solvent, and a mixture of water and the organic solvent. Examples of the organic solvent include aliphatic alcohols having 1 to 5 carbon atoms (e.g. aliphatic monools such as methanol, ethanol, propanol, and 1-butanol; and aliphatic polyols such as ethylene glycol and glycerin); aliphatic ketones such as acetone; nitriles such as acetonitrile and benzonitrile; amides such as N,N-dimethylformamide; and/or sulfoxides such as dimethyl sulfoxide. As the third solvent, one solvent may be used alone, or two or more solvents may be used in combination. A concentration of solid content in the conductive polymer dispersion is, for example, from 0.1% by mass to 10% by mass, inclusive, preferably from 1% by mass to 5% by mass, inclusive.

The conductive polymer and the first/second polymer dopant, which are dispersed in the conductive polymer dispersion, is preferably particles (or a powder). An average particle size of the particles dispersed in the dispersion preferably ranges from 5 nm to 500 nm, inclusive. The average particle size can be determined, for example, from a particle size distribution obtained by a dynamic light scattering method.

The conductive polymer dispersion can be obtained by dispersing the conductive polymer and the first/second polymer dopant in a solvent. Alternatively, as the conductive polymer dispersion, there may be used a dispersion (dispersion A) obtained by removing impurities from a polymerization liquid of the conductive polymer and then mixing the first/second polymer dopant with the polymerization liquid, or a dispersion (dispersion B) obtained by removing impurities from a polymerization liquid formed through polymerization of the conductive polymer under existence of the first/second polymer dopant. In using such a dispersion, those exemplified for the third solvent may be used as a solvent (first solvent) during the polymerization, or the third solvent may be added when impurities are removed. The third solvent may further be added to the dispersions A and B.

The conductive polymer dispersion may also contain another dopant and/or a publicly known additive as necessary. A ratio of the other dopant contained in the conductive polymer dispersion is preferred to be 5 parts by mass or less with respect to 100 parts by mass of the first/second polymer dopant.

(Fourth Step)

In the fourth step, cathode layer 5 is formed by sequentially stacking carbon layer 5a and silver paste layer 5b on a surface of anode body 2 (preferably conductive polymer layer 4 formed) obtained in the third step.

EXAMPLES

Hereinafter, the present disclosure is specifically described with reference to examples and comparative examples. The present disclosure, however, is not limited to the examples below.

Production Example 1

(1) Synthesis of First Polymer Dopant

1 L of pure water was added to a 2-L separable flask with a stirrer, and sodium styrenesulfonate as a first monomer, a second monomer represented by following formula (1A), and a third monomer represented by following formula (2A) were added in the flask to obtain a uniform monomer solution. A molar ratio of the first monomer, the second monomer, and the third monomer (=first unit:second unit: third unit) was set to 80:10:10.

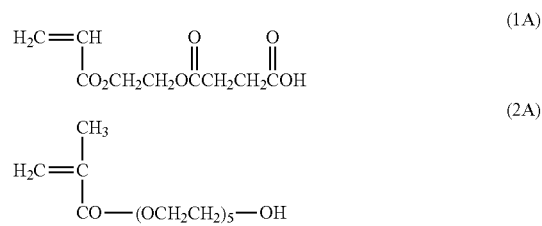

Then, 0.5 g of ammonium persulfate as an oxidant was added to the monomer solution, and a polymerization reaction of the first monomer, the second monomer, and the third monomer was allowed to progress over 8 hours, so that first polymer dopant A1 as a copolymer of these monomers was obtained. An operation including adding purified water and an ion-exchange resin to resulting first polymer dopant A1, stirring a mixture of polymer dopant A1, the purified water and the ion-exchange resin, and filtrating the mixture was repeated to remove impurities.

(2) Synthesis of Conductive Polymer

A 1-L vessel with a stirrer was charged with an aqueous dispersion liquid of first polymer dopant A1 (solid concentration: 3% by mass). Next, 2 parts by mass of sodium persulfate as an oxidant, and 0.2 parts by mass of ferric sulfate as a catalyst were added to 100 parts by mass of the aqueous dispersion liquid, and 1 part by mass of 3,4-ethylenedioxythiophene was then gradually added dropwise to perform chemical oxidation polymerization. Thereafter, an operation including adding an ion-exchange resin to resulting aqueous dispersion liquid containing first polymer dopant A1 and the conductive polymer (poly(3,4-ethylenedioxythiophene)), stirring a mixture of the aqueous dispersion liquid and the ion-exchange resin, and filtrating the mixture was repeated to remove impurities in the liquid, so that a conductive polymer doped with first polymer dopant A1 (conductive polymer A1) was obtained.

Production Example 2

Except for using a compound represented by following formula (2B) as the third monomer, a procedure similar to that in step (1) in Production Example 1 was carried out to obtain first polymer dopant A2 as a copolymer of the above-mentioned monomers. Except for using first polymer dopant A2 as the first polymer dopant, a procedure similar to that in step (2) in Production Example 1 was carried out to obtain a conductive polymer doped with first polymer dopant A2 (conductive polymer A2).

Production Example 3

Except for using a compound represented by following formula (2C) as the third monomer, and setting the molar ratio of the first monomer, the second monomer and, the third monomer (=first unit:second unit:third unit) to 76:12:12, a procedure similar to that in step (1) in Production Example 1 was carried out to obtain first polymer dopant A3 as a copolymer of the above-mentioned monomers. Except for using first polymer dopant A3 as the first polymer dopant, a procedure similar to that in step (2) in Production Example 1 was carried out to obtain a conductive polymer doped with first polymer dopant A3 (conductive polymer A3).

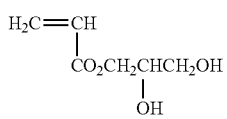
(2C)

Production Example 4

Except for using a compound represented by following formula (1B) as the second monomer, a procedure similar to that in step (1) in Production Example 1 was carried out to obtain first polymer dopant A4 as a copolymer of the above-mentioned monomers. Except for using first polymer dopant A4 as the first polymer dopant, a procedure similar to that in step (2) in Production Example 1 was carried out to obtain a conductive polymer doped with first polymer dopant A4 (conductive polymer A4).

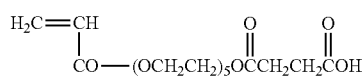
(1B)

Production Example 5

Except for using a compound represented by above formula (1B) as the second monomer, and using a compound represented by above formula (2B) as the third monomer, a procedure similar to that in step (1) in Production Example 1 was carried out to obtain first polymer dopant A5 as a copolymer of the above-mentioned monomers. Except for using first polymer dopant A5 as the first polymer dopant, a procedure similar to that in step (2) in Production Example 1 was carried out to obtain a conductive polymer doped with first polymer dopant A5 (conductive polymer A5).

Production Example 6

Except for using a compound represented by above formula (1B) as the second monomer, using a compound represented by following formula (2D) as the third monomer, and setting the molar ratio of the first monomer, the second monomer, and the third monomer (=first unit:second unit:third unit) to 85:8:7, a procedure similar to that in step (1) in Production Example 1 was carried out to obtain first polymer dopant A6 as a copolymer of the above-mentioned monomers. Except for using first polymer dopant A6 as the first polymer dopant, a procedure similar to that in step (2) in Production Example 1 was carried out to obtain a conductive polymer doped with first polymer dopant A6 (conductive polymer A6).

(2D)

Production Example 7

Except for using a compound represented by following formula (1C) as the second monomer, using a compound represented by above formula (2C) as the third monomer, and setting the molar ratio of the first monomer, the second monomer, and the third monomer (=first unit:second unit:third unit) to 90:5:5, a procedure similar to that in step (1) in Production Example 1 was carried out to obtain first polymer dopant A7 as a copolymer of the above-mentioned monomers. Except for using first polymer dopant A7 as the first polymer dopant, a procedure similar to that in step (2) in Production Example 1 was carried out to obtain a conductive polymer doped with first polymer dopant A7 (conductive polymer A7).

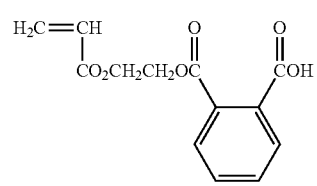
(1C)

Production Example 8

Except for using a compound represented by following formula (1D) as the second monomer, using a compound represented by above formula (2D) as the third monomer, and setting the molar ratio of the first monomer, the second monomer, and the third monomer (=first unit:second unit:third unit) to 60:20:20, a procedure similar to that in step (1) in Production Example 1 was carried out to obtain first polymer dopant A8 as a copolymer of the above-mentioned monomers. Except for using first polymer dopant A8 as the first polymer dopant, a procedure similar to that in step (2) in Production Example 1 was carried out to obtain a conductive polymer doped with first polymer dopant A8 (conductive polymer A8).

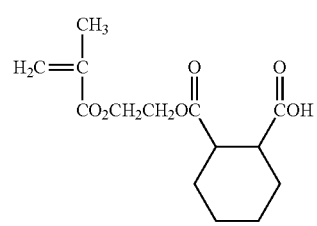
(1D)

Production Example 9

Except for setting the molar ratio of the first monomer, the second monomer, and the third monomer (=first unit:second unit:third unit) to 70:15:15, a procedure similar to that in step (1) in Production Example 8 was carried out to obtain first polymer dopant A9 as a copolymer of the above-mentioned monomers. Except for using first polymer dopant A9 was used as the first polymer dopant, a procedure similar to that in step (2) in Production Example 1 was carried out to obtain a conductive polymer doped with first polymer dopant A9 (conductive polymer A9).

Production Example 10

Except for using a compound represented by following formula (1E) as the second monomer, using a compound represented by following formula (2E) as the third monomer, and setting the molar ratio of the first monomer, the second monomer, and the third monomer (=first unit:second unit:third unit) to 95:3:2, a procedure similar to that in step (1) in Production Example 1 was carried out to obtain first polymer dopant A10 as a copolymer of the above-mentioned monomers. Except for using first polymer dopant A10 as the first polymer dopant, a procedure similar to that in step (2) in Production Example 1 was carried out to obtain a conductive polymer doped with first polymer dopant A10 (conductive polymer A10).

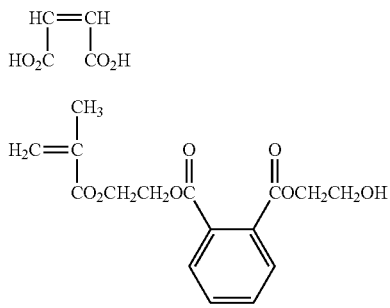

Production Example 11

Except for using a compound represented by following formula (1F) as the second monomer, using a compound represented by following formula (2F) as the third monomer, and setting the molar ratio of the first monomer, the second monomer, and the third monomer (=first unit:second unit:third unit) to 50:25:25, a procedure similar to that in step (1) in Production Example 1 was carried out to obtain first polymer dopant A11 as a copolymer of the above-mentioned monomers. Except for using first polymer dopant A11 as the first polymer dopant, a procedure similar to that in step (2) in Production Example 1 was carried out to obtain a conductive polymer doped with first polymer dopant A11 (conductive polymer A11).

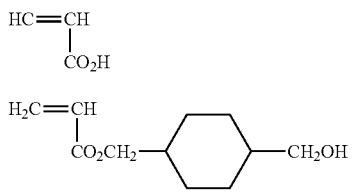

Production Example 12

Except for using only the first monomer, sodium styrenesulfonate, and not using the second monomer and the third monomer, a procedure similar to that in Production Example 1 was carried out to obtain third polymer dopant B1. Except for using third polymer dopant B1 in place of first polymer dopant A1, a procedure similar to that in step (2) in Production Example 1 was carried out to obtain a conductive polymer doped with third polymer dopant B1 (conductive polymer B1).

Production Example 13

Except for not using the third monomer, and setting a molar ratio of the first monomer and the second monomer (=first unit:second unit) to 50:50, a procedure similar to that in Production Example 1 was carried out to obtain third polymer dopant B2.

Except for using third polymer dopant B2 in place of first polymer dopant A, a procedure similar to that in step (2) in Production Example 1 was carried out to obtain a conductive polymer doped with third polymer dopant B2 (conductive polymer B2).

Production Example 14

Except for not using the second molar, using a compound represented by above formula (2C) as the third monomer, and setting a molar ratio of the first monomer and the third monomer (=first unit:third unit) to 50:50, a procedure similar to that in Production Example 1 was carried out to obtain third polymer dopant B3. Except for using third polymer dopant B3 in place of first polymer dopant A, a procedure similar to that in step (2) in Production Example 1 was carried out to obtain a conductive polymer doped with third polymer dopant B3 (conductive polymer B3).

Example 1

An electrolytic capacitor was manufactured in a manner described below, and characteristics of the electrolytic capacitor were evaluated.

(1) Step of Preparing Anode Body (First Step)

Both surfaces of an aluminum foil (thickness: 100 µm) as a base material were roughened by etching to manufacture an anode body.

(2) Step of Forming Dielectric Layer (Second Step)

A part on one end side of the anode body (a part from a separation part to one end) was immersed in an anodizing solution, and a 70 V DC voltage was applied for 20 minutes to form a dielectric layer including aluminum oxide.

(3) Step of Forming Conductive Polymer Layer (Third Step)

The anode body including the dielectric layer was immersed in an aqueous dispersion liquid (first treatment liquid) containing 1% by mass of conductive polymer B1, then taken out from the first treatment liquid, and dried at 120° C. for a period ranging from 10 minutes to 30 minutes. The immersion in the first treatment liquid and the drying were repeated again, so that a first conductive polymer layer was formed so as to cover at least a part of a surface of the dielectric layer. An average thickness of the first conductive polymer layer measured by a scanning electron microscope (SEM) was about 1 µm.

The anode body including the first conductive polymer layer was immersed in an aqueous dispersion liquid (second treatment liquid) containing 4% by mass of the conductive polymer A1, then taken out from the second treatment liquid, and subjected to a heating treatment at 120° C. for 10 minutes to 30 minutes. The immersion in the second treatment liquid and the heating treatment were further repeated two times, so that a second conductive polymer layer was formed so as to cover at least a part of a surface of the first conductive polymer layer and at least a part of the dielectric layer that is exposed without being covered with the first conductive polymer layer. Simultaneously, a part of the carboxy group was intramolecularly and/or intermolecularly condensed with a part of the hydroxy group to form an ester in the second conductive polymer layer. An average thickness of the second conductive polymer layer measured by a SEM was about 30 μm.

(4) Step of Forming Cathode Layer (Fourth Step)

The anode body that includes the dielectric layer covered with first and second conductive polymer layers was immersed in a dispersion liquid obtained by dispersing graphite particles in water, taken out from the dispersion liquid, and then dried to form a carbon layer. Drying was carried out at a temperature ranging from 130° C. to 180° C. for a period ranging from 10 minutes to 30 minutes.

Next, a silver paste containing silver particles and a binder resin (epoxy resin) was applied onto a surface of the carbon layer, and the layer coated with the silver paste was heated at a temperature ranging from 150° C. to 200° C. for a period ranging from 10 minutes to 60 minutes to cure the binder resin, so that a silver paste layer was formed. Thus, a cathode layer was formed that was configured to include the carbon layer and the silver paste layer, so that a capacitor element was prepared.

(5) Assembling of Electrolytic Capacitor

The cathode layer of the capacitor element was joined with one end (first end) of a cathode terminal with a conductive adhesive material. The other end of the anode body, which protruded from the capacitor element, was joined with one end (first end) of an anode terminal by laser welding.

Next, resin outer packing formed of an insulating resin was formed around the capacitor element by a transfer molding method. In forming the resin outer packing, the other end (second end) of the anode terminal and the other end (second end) of the cathode terminal were made to be drawn out from the resin outer packing. Thus, 250 electrolytic capacitors (A1) of Example 1 were prepared.

(6) Evaluation of Moisture Resistance

An initial ESR value ($E_0$) at a frequency of 100 kHz was measured for the electrolytic capacitor with an LCR meter for 4-terminal measurement. The electrolytic capacitor was left standing in a constant-temperature and constant-humidity chamber at a temperature of 60° C. and a humidity of 90% for 500 hours, and an ESR value ($E_x$) was measured again in accordance with the above-mentioned method. An increase rate ($\Delta E=\{(E_x-E_0)/E_0\}\times 100\%$) of the ESR value ($E_x$) with respect to the initial ESR value ($E_0$) was calculated. Table 1 shows results of the evaluation. ESR values were measured for randomly selected 120 electrolytic capacitors, respectively, and an average value of the ESR values was calculated.

(7) Leakage Current (LC)

A voltage of 10 V was applied between anode body 2 and cathode layer 5 of the electrolytic capacitor and leakage current was measured after 40 seconds of the application. Electrolytic capacitors having a leakage current amount of more than 100 μA was determined to be defective, and a LC defective rate (=(number of defectives/120)×100%) was calculated, and taken as a reference index of the leakage current. Table 1 shows results of the evaluation.

Examples 2 to 11

Except for using aqueous dispersion liquids containing 4% by mass of conductive polymers A2 to A11 as second treatment liquids, respectively, a procedure similar to that in Example 1 was carried out to prepare 250 electrolytic capacitors for each of electrolytic capacitors A2 to A11 of examples, and the electrolytic capacitors were evaluated. Table 1 shows results of the evaluation.

Comparative Examples 1 to 3

Except for using aqueous dispersion liquids containing 4% by mass of conductive polymers B1 to B3 as second treatment liquids, respectively, a procedure similar to that in Example 1 was carried out to prepare 250 electrolytic capacitors for each of electrolytic capacitors B1 to B3, and the electrolytic capacitors were evaluated. Table 1 shows results of the evaluation.

TABLE 1

|  | Con-ductive polymer | Kind of monomer | | $E_0$ (mΩ) | $\Delta E$ (%) | LC defective rate (%) |
|---|---|---|---|---|---|---|
|  |  | Second monomer | Third monomer |  |  |  |
| Example 1 | A1 | 1A | 2A | 39 | 45 | 0.1 |
| Example 2 | A2 | 1A | 2B | 38 | 41 | 0.1 |
| Example 3 | A3 | 1A | 2C | 40 | 43 | 0.2 |
| Example 4 | A4 | 1B | 2A | 37 | 52 | 0.2 |
| Example 5 | A5 | 1B | 2B | 38 | 55 | 0.1 |
| Example 6 | A6 | 1B | 2D | 39 | 58 | 0.5 |
| Example 7 | A7 | 1C | 2C | 42 | 65 | 0.3 |
| Example 8 | A8 | 1D | 2D | 44 | 85 | 0.2 |
| Example 9 | A9 | 1D | 2D | 45 | 89 | 0.2 |
| Example 10 | A10 | 1E | 2E | 48 | 123 | 3.1 |
| Example 11 | A11 | 1F | 2F | 44 | 140 | 0.2 |
| Comparative Example 1 | B1 | — | — | 44 | 550 | 8.7 |
| Comparative Example 2 | B2 | 1A | — | 50 | 483 | 1.1 |
| Comparative Example 3 | B3 | — | 2C | 109 | 572 | 1 |

As shown in Table 1, in examples, the ESR increase rate after the moisture resistance test was kept lower as compared to comparative examples. In addition, examples show a low value as a LC defective rate, indicating that a high restoration function is attained.

Production Example 15

(1) Synthesis of Second Polymer Dopant

1 L of pure water was added to a 2-L separable flask with a stirrer, and sodium styrenesulfonate (1a-th monomer), and a second monomer represented by above formula (1A) were added in the flask to obtain a uniform monomer solution. A molar ratio of the 1a-th monomer and the second monomer (=1a-th unit:second unit) was set to 80:20.

Further, 0.5 g of ammonium persulfate as an oxidant was added to the monomer solution, and a polymerization reaction of the 1a-th monomer and the second monomer was allowed to progress over 8 hours, so that second copolymer A1 as a copolymer of these monomers was obtained. An operation including adding pure water and an ion-exchange resin to resulting second copolymer A, stirring the mixture, and filtrating the mixture was repeated to remove impurities.

On the other hand, except for using sodium styrenesulfonate (1b-th monomer), and a third monomer represented by above formula (2A), a procedure similar to that described above was carried out to obtain third copolymer A1. A molar ratio of the 1b-th monomer and the third monomer (=1b-th unit:third unit) was set to 80:20. An operation including adding pure water and an ion-exchange resin to resulting third copolymer A1, stirring the mixture, and filtrating the mixture was repeated to remove impurities.

(2) Synthesis of Conductive Polymer

A 1-L vessel with a stirrer was charged with an aqueous dispersion liquid of second copolymer A1 (solid concentration: 3% by mass). Next, 2 parts by mass of sodium persulfate as an oxidant, and 0.2 parts by mass of ferric sulfate as a catalyst were added to 100 parts by mass of the aqueous dispersion liquid, and 1 part by mass of 3,4-ethylenedioxythiophene was then gradually added dropwise to perform chemical oxidation polymerization. An operation including adding an ion-exchange resin to resulting aqueous dispersion liquid containing second copolymer A1 and a conductive polymer (poly(3,4-ethylenedioxythiophene)), stirring a mixture of the aqueous dispersion liquid and the ion-exchange resin, and filtrating the mixture was repeated to remove impurities in the liquid, so that conductive polymer P2-1 doped with second copolymer A1 was obtained.

On the other hand, except for using an aqueous dispersion liquid of third copolymer A1 (solid concentration: 3% by mass), a procedure similar to that described above was carried out to obtain conductive polymer P3-1 doped with third copolymer A1. Resulting conductive polymer P2-1 and conductive polymer P3-1 were mixed with each other to prepare a dispersion liquid of conductive polymer A12 containing 1.5% by mass of conductive polymer P2-1 and 1.5% by mass of conductive polymer P3-1.

Production Example 16

Except for using a compound represented by above formula (2B) as the third monomer, a procedure similar to that in step (1) in Production Example 15 was carried out to obtain second copolymer P2-1 and third copolymer P3-2. Except for using second copolymer P2-1 and third copolymer P3-2, a procedure similar to that in step (2) in Production Example 15 was carried out to prepare a dispersion liquid of conductive polymer A13 (second polymer dopant) containing second copolymer P2-1 and third copolymer P3-2.

Production Example 17

Except for setting a molar ratio of the first monomer and the second monomer (=first unit:second unit) to 76:24, a procedure similar to that in step (1) in Production Example 15 was carried out to obtain second copolymer P2-2. Except for using a compound represented by above formula (2C) as the third monomer, and setting a molar ratio of the first monomer and the third monomer (=first unit:third unit) to 76:24, a procedure similar to that in step (1) in Production Example 15 was carried out to obtain third copolymer P3-3. Except for using second copolymer P2-2 and third copolymer P3-3, a procedure similar to that in step (2) in Production Example 15 was carried out to prepare a dispersion liquid of conductive polymer A14 (second polymer dopant) containing second copolymer P2-2 and third copolymer P3-3.

Production Example 18

Except for using a compound represented by above formula (1B) as the second monomer, a procedure similar to that in step (1) in Production Example 15 was carried out to obtain second copolymer P2-3 and third copolymer P3-1. Except for using second copolymer P2-3 and third copolymer P3-1, a procedure similar to that in step (2) in Production Example 15 was carried out to prepare conductive polymer A15 (second polymer dopant) containing second copolymer P2-3 and third copolymer P3-1.

Production Example 19

Except for using a compound represented by above formula (1B) as the second monomer, and using a compound represented by above formula (2B) as the third monomer, a procedure similar to that in step (1) in Production Example 15 was carried out to obtain second copolymer P2-3 and third copolymer P3-2. Except for using second copolymer P2-3 and third copolymer P3-2, a procedure similar to that in step (2) in Production Example 15 was carried out to prepare a dispersion liquid of conductive polymer A16 (second polymer dopant) containing second copolymer P2-3 and third copolymer P3-2.

Production Example 20

Except for using a compound represented by above formula (1B) as the second monomer, and setting a molar ratio of the first monomer and the second monomer (=first unit: second unit) to 84:16, a procedure similar to that in step (1) in Production Example 15 was carried out to obtain second copolymer P2-4. Except for using a compound represented by above formula (2D) as the third monomer, and setting a molar ratio of the first monomer and the third monomer (=first unit:third unit) to 84:16, a procedure similar to that in step (1) in Production Example 15 was carried out to obtain third copolymer P3-4. Except for using second copolymer P2-4 and third copolymer P3-4, a procedure similar to that in step (2) in Production Example 15 was carried out to prepare a dispersion liquid of conductive polymer A17 (second polymer dopant) containing second copolymer P2-4 and third copolymer P3-4.

Production Example 21

Except for using a compound represented by above formula (1C) as the second monomer, and setting a molar ratio of the first monomer and the second monomer (=first unit: second unit) to 90:10, a procedure similar to that in step (1) in Production Example 15 was carried out to obtain second copolymer P2-5. Except for using a compound represented by above formula (2C) as the third monomer, and setting a molar ratio of the first monomer and the third monomer (=first unit:third unit) to 90:10, a procedure similar to that in step (1) in Production Example 15 was carried out to obtain third copolymer P3-5. Except for using second copolymer P2-5 and third copolymer P3-5, a procedure similar to that in step (2) in Production Example 15 was carried out to prepare a dispersion liquid of conductive polymer A18 (second polymer dopant) containing second copolymer P2-5 and third copolymer P3-5.

Production Example 22

Except for using a compound represented by above formula (1D) as the second monomer, and setting a molar ratio of the first monomer and the second monomer (=first unit: second unit) to 60:40, a procedure similar to that in step (1) in Production Example 15 was carried out to obtain second copolymer P2-6. Except for using a compound represented by above formula (2D) as the third monomer, and setting a molar ratio of the first monomer and the third monomer (=first unit:third unit) to 60:40, a procedure similar to that in step (1) in Production Example 15 was carried out to obtain third copolymer P3-6. Except for using second copolymer P2-6 and third copolymer P3-6, a procedure similar to that in step (2) in Production Example 15 was carried out to prepare a dispersion liquid of conductive polymer A19 (second polymer dopant) containing second copolymer P2-6 and third copolymer P3-6.

Production Example 23

Except for setting a molar ratio of the first monomer and the second monomer (=first unit:second unit) to 70:30, a procedure similar to that in Production Example 22 was carried out to obtain second copolymer P2-7. Except for setting a molar ratio of the first monomer and the third monomer (=first unit:third unit) to 70:30, a procedure similar to that in Production Example 22 was carried out to obtain third copolymer P3-7. Except for using second copolymer P2-7 and third copolymer P3-7, a procedure similar to that in step (2) in Production Example 15 was carried out to prepare a dispersion liquid of conductive polymer A20 (second polymer dopant) containing second copolymer P2-7 and third copolymer P3-7.

Production Example 24

Except for using a compound represented by above formula (1E) as the second monomer, and setting a molar ratio of the first monomer and the second monomer (=first unit:second unit) to 94:6, a procedure similar to that in step (1) in Production Example 15 was carried out to obtain second copolymer P2-8. Except for using a compound represented by above formula (2E) as the third monomer, and setting a molar ratio of the first monomer and the third monomer (=first unit:third unit) to 96:4, a procedure similar to that in step (1) in Production Example 15 was carried out to obtain third copolymer P3-8. Except for using second copolymer P2-8 and third copolymer P3-8, a procedure similar to that in step (2) in Production Example 15 was carried out to prepare a dispersion liquid of conductive polymer A21 (second polymer dopant) containing second copolymer P2-8 and third copolymer P3-8.

Production Example 25

Except for using a compound represented by above formula (1F) as the second monomer, and setting a molar ratio of the first monomer and the second monomer (=first unit: second unit) to 50:50, a procedure similar to that in step (1) in Production Example 15 was carried out to obtain second copolymer P2-9. Except for using a compound represented by above formula (2F) as the third monomer, and setting a molar ratio of the first monomer and the third monomer (=first unit:third unit) to 50:50, a procedure similar to that in step (1) in Production Example 15 was carried out to obtain third copolymer P3-9. Except for using second copolymer P2-9 and third copolymer P3-9, a procedure similar to that in step (2) in Production Example 15 was carried out to prepare a dispersion liquid of conductive polymer A22 (second polymer dopant) containing second copolymer P2-9 and third copolymer P3-9.

Production Example 26

Except for using a compound represented by above formula (1A) as the second monomer, and setting a molar ratio of the first monomer and the second monomer (=first unit: second unit) to 50:50, a procedure similar to that in step (1) in Production Example 15 was carried out to obtain second copolymer P2-10. Except for not using the third monomer, a procedure similar to that in step (1) in Production Example 15 was carried out to obtain polymer P1b of the 1b-th monomer. Except for using second copolymer P2-10 and polymer P1b, a procedure similar to that in step (2) in Production Example 15 was carried out to prepare a dispersion liquid of conductive polymer B4 containing second copolymer P2-10 and polymer P1b.

Production Example 27

Except for not using the second monomer, a procedure similar to that in step (1) in Production Example 15 was carried out to obtain polymer P1a of the 1a-th monomer. Except for using a compound represented by above formula (2C) as the third monomer, and setting a molar ratio of the first monomer and the third monomer (=first unit:third unit) to 50:50, a procedure similar to that in step (1) in Production Example 15 was carried out to obtain third copolymer P3-10. Except for using polymer P1a and third copolymer P3-10, a procedure similar to that in step (2) in Production Example 15 was carried out to prepare a dispersion liquid of conductive polymer B5 containing polymer P1a and third copolymer P3-10.

Examples 12 to 22

Except for using aqueous dispersion liquids containing 4% by mass of conductive polymers A12 to A22 as second treatment liquids, respectively, a procedure similar to that in Example 1 was carried out to prepare 250 electrolytic capacitors for each of examples, and characteristics of the electrolytic capacitors were evaluated. Table 2 shows results of the evaluation.

Comparative Examples 4 and 5

Except for using aqueous dispersion liquids containing 4% by mass of conductive polymers B4 and B5 as second treatment liquids, respectively, a procedure similar to that in Example 1 was carried out to prepare 250 electrolytic capacitors for each of examples, and characteristics of the electrolytic capacitors were evaluated. Table 2 shows results of the evaluation.

TABLE 2

| | Conductive polymer | Kind of monomer | | $E_0$ (mΩ) | ΔE (%) | LC defective rate (%) |
| --- | --- | --- | --- | --- | --- | --- |
| | | Second monomer | Third monomer | | | |
| Example 12 | A12 | 1A | 2A | 37 | 52 | 0.1 |
| Example 13 | A13 | 1A | 2B | 36 | 61 | 0.1 |
| Example 14 | A14 | 1A | 2C | 39 | 54 | 0.1 |
| Example 15 | A15 | 1B | 2A | 40 | 60 | 0.2 |
| Example 16 | A16 | 1B | 2B | 39 | 63 | 0.1 |
| Example 17 | A17 | 1B | 2D | 41 | 65 | 0.2 |
| Example 18 | A18 | 1C | 2C | 44 | 66 | 0.6 |
| Example 19 | A19 | 1D | 2D | 48 | 89 | 0.2 |
| Example 20 | A20 | 1D | 2D | 45 | 95 | 0.2 |
| Example 21 | A21 | 1E | 2E | 47 | 108 | 4.3 |
| Example 22 | A22 | 1F | 2F | 49 | 110 | 0.3 |
| Comparative Example 1 | B1 | — | — | 44 | 550 | 8.7 |
| Comparative Example 4 | B4 | 1A | — | 51 | 390 | 1.5 |

TABLE 2-continued

| | Con-ductive polymer | Kind of monomer | | $E_0$ (mΩ) | ΔE (%) | LC defective rate (%) |
|---|---|---|---|---|---|---|
| | | Second monomer | Third monomer | | | |
| Comparative Example 5 | B5 | — | 2C | 125 | 405 | 1.4 |

As shown in Table 2, in examples, the ESR increase rate after the moisture resistance test was kept lower as compared to comparative examples. In addition, examples show a low value as a LC defective rate, indicating that a high restoration function is attained.

The electrolytic capacitor according to the present disclosure can be used for various uses in which excellent moisture resistance is required.

What is claimed is:

1. An electrolytic capacitor comprising:
    an anode body;
    a dielectric layer formed on the anode body; and
    a conductive polymer layer covering at least a part of the dielectric layer, wherein:
    the conductive polymer layer includes a conductive polymer and a polymer dopant, and
    the polymer dopant includes a first copolymer including:
        (A) a first unit derived from a first monomer having a sulfonate group;
        (B) a second unit derived from a second monomer having a carboxy group; and
        (C) a third unit derived from a third monomer having a hydroxy group.

2. The electrolytic capacitor according to claim 1, wherein a ratio r1 of a total of the second unit and the third unit to a total of the first unit, the second unit and the third unit that are included in the first copolymer is from 5 mol % to 50 mol %, inclusive.

3. An electrolytic capacitor comprising:
    an anode body;
    a dielectric layer formed on the anode body; and
    a conductive polymer layer covering at least a part of the dielectric layer,
    the conductive polymer layer including a conductive polymer and a polymer dopant, wherein:
    the polymer dopant includes:
    a second copolymer which includes (A1) a 1a-th unit derived from a 1a-th monomer having a sulfonate group, and (B) a second unit derived from a second monomer having a carboxy group; and
    a third copolymer which includes (A2) a 1b-th unit derived from a 1b-th monomer having a sulfonate group, and (C) a third unit derived from a third monomer having a hydroxy group.

4. The electrolytic capacitor according to claim 3, wherein:
    a ratio r2 of the second unit to a total of the 1a-th unit and the second unit that are included in the second copolymer is from 5 mol % to 50 mol %, inclusive, and
    a ratio r3 of the third unit to a total of the 1b-th unit and the third unit that are included in the third copolymer is from 5 mol % to 50 mol %, inclusive.

5. The electrolytic capacitor according to claim 1, wherein the second unit has a carboxy group represented by formula (1):

$$—CO—R^1—COOH \qquad (1),$$

wherein $R^1$ represents an aliphatic hydrocarbon group having 1 to 8 carbon atoms, an aromatic group, or a divalent group $—OR^2—$, $R^2$ representing an aliphatic hydrocarbon group having 1 to 8 carbon atoms or an aromatic group.

6. The electrolytic capacitor according to claim 3, wherein the second unit has a carboxy group represented by formula (1):

$$—CO—R^1—COOH \qquad (1),$$

wherein $R^1$ represents an aliphatic hydrocarbon group having 1 to 8 carbon atoms, an aromatic group, or a divalent group $—OR^2—$, $R^2$ representing an aliphatic hydrocarbon group having 1 to 8 carbon atoms or an aromatic group.

7. The electrolytic capacitor according to claim 1, wherein the second unit is a unit represented by formula (1a):

$$—CH_2—CR^3R^4— \qquad (1a),$$

wherein $R^3$ represents a hydrogen atom or a methyl group, and $R^4$ represents $—CO—(OCH_2CH_2)_{n1}—O—CO—R^{1a}—COOH$, n1 representing an integer of 1 to 10, $R^{1a}$ representing an aliphatic hydrocarbon group having 1 to 8 carbon atoms, or an aromatic group; or
the second unit is a unit represented by formula (1b):

$$—CHR^5—CHR^6— \qquad (1b),$$

wherein $R^5$ represents a carboxy group, or $—CO—(OCH_2CH_2)_{n2}—O—CO—R^{1b}—COOH$, and $R^6$ represents $—CO—(OCH_2CH_2)_{n3}—O—CO—R^{1c}—COOH$, n2 and n3 each representing an integer of 1 to 10, $R^{1b}$ and $R^{1c}$ each representing an aliphatic hydrocarbon group having 1 to 8 carbon atoms or an aromatic group.

8. The electrolytic capacitor according to claim 3, wherein the second unit is a unit represented by formula (1a):

$$—CH_2—CR^3R^4— \qquad (1a),$$

wherein $R^3$ represents a hydrogen atom or a methyl group, and $R^4$ represents $—CO—(OCH_2CH_2)_{n1}—O—CO—R^{1a}—COOH$, n1 representing an integer of 1 to 10, $R^{1a}$ representing an aliphatic hydrocarbon group having 1 to 8 carbon atoms, or an aromatic group); or
the second unit is a unit represented by formula (1b):

$$—CHR^5—CHR^6— \qquad (1b),$$

(wherein $R^5$ represents a carboxy group, or $—CO—(OCH_2CH_2)_{n2}—O—CO—R^{1b}—COOH$, and $R^6$ represents $—CO—(OCH_2CH_2)_{n3}—O—CO—R^{1c}—COOH$, n2 and n3 each representing an integer of 1 to 10, $R^{1b}$ and $R^{1c}$ each representing an aliphatic hydrocarbon group having 1 to 8 carbon atoms or an aromatic group.

9. The electrolytic capacitor according to claim 1, wherein the third unit has a hydroxy group represented by formula (2a):

$$—(O—R^7)_n—OH \qquad (2a),$$

wherein $R^7$ represents an aliphatic hydrocarbon group having 2 to 10 carbon atoms, and n represents 1 to 10; or
the third unit has a hydroxy group represented by formula (2b):

$$—NH—R^8—OH \qquad (2b),$$

wherein $R^8$ represents an aliphatic hydrocarbon group having 1 to 10 carbon atoms.

10. The electrolytic capacitor according to claim 3, wherein the third unit has a hydroxy group represented by formula (2a):

$$—(O—R^7)_n—OH \quad (2a),$$

wherein $R^7$ represents an aliphatic hydrocarbon group having 2 to 10 carbon atoms, and n represents 1 to 10; or the third unit has a hydroxy group represented by formula (2b):

$$—NH—R^8—OH \quad (2b),$$

wherein $R^8$ represents an aliphatic hydrocarbon group having 1 to 10 carbon atoms.

11. The electrolytic capacitor according to claim 1, wherein the first unit is a unit derived from an aromatic vinyl monomer having a sulfonate group.

12. The electrolytic capacitor according to claim 3, wherein each of the 1a-th unit and the 1b-th unit is a unit derived from an aromatic vinyl monomer having a sulfonate group.

13. A conductive polymer dispersion comprising:
a conductive polymer;
a polymer dopant; and
a solvent, wherein:
the polymer dopant includes a first copolymer including:
(A) a first unit derived from a first monomer having a sulfonate group;
(B) a second unit derived from a second monomer having a carboxy group; and
(C) a third unit derived from a third monomer having a hydroxy group.

14. The conductive polymer dispersion according to claim 13, wherein a ratio r1 of a total of the second unit and the third unit to a total of the first unit, the second unit and the third unit that are included in the first copolymer is from 5 mol % to 50 mol %, inclusive.

15. A conductive polymer dispersion comprising:
a conductive polymer;
a polymer dopant; and
a solvent, wherein:
the polymer dopant includes:
a second copolymer which includes (A1) a 1a-th unit derived from a 1a-th monomer having a sulfonate group, and (B) a second unit derived from a second monomer having a carboxy group; and
a third copolymer which includes (A2) a 1b-th unit derived from a 1b-th monomer having a sulfonate group, and (C) a third unit derived from a third monomer having a hydroxy group.

16. The conductive polymer dispersion according to claim 15, wherein:

a ratio r2 of the second unit to a total of the 1a-th unit and the second unit that are included in the second copolymer is from 5 mol % to 50 mol %, inclusive, and
a ratio r3 of the third unit to a total of the 1b-th unit and the third unit that are included in the third copolymer is from 5 mol % to 50 mol %, inclusive.

17. The conductive polymer dispersion according to claim 13, wherein the second unit has a carboxy group represented by formula (1):

$$—CO—R^1—COOH \quad (1),$$

wherein $R^1$ represents an aliphatic hydrocarbon group having 1 to 8 carbon atoms, an aromatic group, or a divalent group $—OR^2—$, $R^2$ representing an aliphatic hydrocarbon group having 1 to 8 carbon atoms or an aromatic group.

18. The conductive polymer dispersion according to claim 13, wherein the second unit is a unit represented by formula (1a):

$$—CH_2—CR^3R^4— \quad (1a),$$

wherein $R^3$ represents a hydrogen atom or a methyl group, and $R^4$ represents $—CO—(OCH_2CH_2)_{n1}—O—CO—R^{1a}—COOH$, n1 representing an integer of 1 to 10, $R^{1a}$ representing an aliphatic hydrocarbon group having 1 to 8 carbon atoms, or an aromatic group; or
the second unit is a unit represented by formula (1b):

$$—CHR^5—CHR^6— \quad (1b),$$

wherein $R^5$ represents a carboxy group, or $—CO—(OCH_2CH_2)_{n2}—O—CO—R^{1b}—COOH$, and $R^6$ represents $—CO—(OCH_2CH_2)_{n3}—O—CO—R^{1c}—COOH$, n2 and n3 each representing an integer of 1 to 10, $R^{1b}$ and $R^{1c}$ each representing an aliphatic hydrocarbon group having 1 to 12 carbon atoms or an aromatic group.

19. The electrolytic capacitor according to claim 13, wherein the third unit has a hydroxy group represented by formula (2a):

$$—(O—R^7)_n—OH \quad (2a),$$

wherein $R^7$ represents an aliphatic hydrocarbon group having 2 to 10 carbon atoms, and n represents 1 to 10; or
the third unit has a hydroxy group represented by formula (2b):

$$—NH—R^8—OH \quad (2b),$$

wherein $R^8$ represents an aliphatic hydrocarbon group having 1 to 10 carbon atoms.

20. The conductive polymer dispersion according to claim 13, wherein the first unit is a unit derived from an aromatic vinyl monomer having a sulfonate group.

* * * * *